United States Patent
Tayman (10) Patent No.: US 8,070,090 B2
(45) Date of Patent: Dec. 6, 2011

(54) STOP-ROTOR ROTARY WING AIRCRAFT

(75) Inventor: Steven K. Tayman, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 420 days.

(21) Appl. No.: 12/486,023

(22) Filed: Jun. 17, 2009

(65) Prior Publication Data

US 2010/0230547 A1     Sep. 16, 2010

Related U.S. Application Data

(60) Provisional application No. 61/094,794, filed on Sep. 5, 2008.

(51) Int. Cl.
*B64C 27/22* (2006.01)

(52) U.S. Cl. .......................... 244/7 C; 244/6

(58) Field of Classification Search ............... 244/6, 7 A, 244/7 B, 7 C, 7 R, 12.4, 17.11, 17.19, 17.21, 244/45 R, 48
See application file for complete search history.

(56) References Cited

U.S. PATENT DOCUMENTS

| | | |
|---|---|---|
| 2,423,625 A | 7/1947 | Smith |
| 2,483,480 A | 10/1949 | Stalker |
| 3,035,789 A | 5/1962 | Young |
| 3,179,352 A | 4/1965 | Nelson |
| 3,506,219 A | 4/1970 | Mouille et al. |
| 3,884,431 A | 5/1975 | Burrell |
| 4,093,155 A | 6/1978 | Kincaid, Jr. |
| 4,923,144 A | 5/1990 | Eickmann |
| 4,925,131 A | 5/1990 | Eickmann |
| D311,719 S | 10/1990 | Haga |
| 5,381,985 A | 1/1995 | Wechsler et al. |
| 5,799,900 A * | 9/1998 | McDonnell .................. 244/7 A |
| 5,839,691 A | 11/1998 | Lariviere |
| 6,082,671 A | 7/2000 | Michelson |
| 6,206,324 B1 | 3/2001 | Smith |
| 6,227,481 B1 | 5/2001 | Fenny et al. |
| 6,367,736 B1 | 4/2002 | Pancotti |
| 6,607,161 B1 | 8/2003 | Krysinski et al. |
| 6,626,398 B1 | 9/2003 | Cox et al. |
| 6,655,631 B2 | 12/2003 | Austen-Brown |
| 6,659,394 B1 | 12/2003 | Shenk |
| 6,695,254 B2 | 2/2004 | Zoppitelli et al. |

(Continued)

OTHER PUBLICATIONS

Tayman, S.K., Walden, A.B., "An Investigation of the Aerodynamic Performance of the Spin-Wing Concept", NRL/MR/5710—98-8147, pp. 1-17, Feb. 27, 1998.

(Continued)

*Primary Examiner* — Joshua Michener
*Assistant Examiner* — Nicholas McFall
(74) *Attorney, Agent, or Firm* — Amy L. Ressing; Sally A. Ferrett (57) ABSTRACT

Systems and methods for transitioning an aircraft between helicopter and fixed wing flight modes are provided. In one embodiment, an aircraft comprises a plurality of wings each having a spar and a flap; a flap actuator configured to move the flap with respect to the spar; and a center section rotatably coupled to each spar. The center section includes at least one spar actuator configured to rotate at least one of the wings about a rotational axis of the spar when the aircraft transitions between helicopter and fixed wing flight modes.

9 Claims, 7 Drawing Sheets

U.S. PATENT DOCUMENTS

| | | | |
|---|---|---|---|
| 6,892,980 | B2 | 5/2005 | Kawai |
| 6,896,221 | B1 | 5/2005 | Einarsson |
| 6,959,895 | B2 | 11/2005 | Cylinder et al. |
| 6,974,105 | B2 | 12/2005 | Pham |
| 7,118,066 | B2 | 10/2006 | Allen |
| 7,264,199 | B2 | 9/2007 | Zientek |
| 7,306,186 | B2 | 12/2007 | Kusic |
| 7,448,571 | B1 | 11/2008 | Carter, Jr. et al. |
| 7,584,923 | B2 | 9/2009 | Burrage |
| 7,665,688 | B2 | 2/2010 | Cylinder et al. |
| 2002/0100835 | A1 | 8/2002 | Kusic |
| 2005/0230519 | A1 | 10/2005 | Hurley |

OTHER PUBLICATIONS

Green, W.E. and Oh, P.Y., "Autonomous Hovering of a Fixed-Wing Micro Air Vehicle", Proceedings of the 2006 IEEE International Conference on Robotics and Automation, May 2006, pp. 2164-2169.

Mueller, T.J. and Delaurier, J.D., "Aerodynamics of Small Vehicles", Ann. Rev. Fluid Mech., vol. 35, pp. 89-111, 2003.

Kellogg, J.C. et al., "Design and Development of the Samara Stop-Rotor Hybrid Micro Air Vehicle", 20th Bristol UAV Systems Conference—Apr. 2005, 10 pages.

Industry Shorts—Service: Small Wonder, [online], Aug. 25, 2004, [retrieved on Mar. 22, 2007], retrieved using Internet <http://www.roboticstrends.com/displayarticle475.html?POSTNUKESID=59d0-554e026e80c213055708c54a716e>.

Dragonfly Canard—Rotor-Wing UAV, [online], Jul. 30, 1997, [retrieved on Mar. 22, 2007], retrieved using Internet <http://www.fas.org/irp/program/collect/crw.htm>.

Boeing X-50 Dragonfly, [online], [retrieved on Mar. 22, 2007], retrieved using Internet <http://avia.ltd.ee/helicopters.sub.--eng/boeing.sub.--x-50-r.html>-.

Kellogg, J. et al., "Nonconventional Aerodynamics for Micro-UAVs", Proc. 16th International UAV Systems Conference, Bristol, UK, Apr. 2001, 10 pages.

Kellogg, J. et al., "The NRL MITE Air Vehicle", Proceedings of the Bristol RPV/AUV Systems Conference, 2001, 13 pages.

Kellogg, J. et al., "Development and Testing of Unconventional Micro Air Vehicle Configurations", Proc. of Unmanned/Unlimited Conference, AIAA, Sep. 2003, 10 pages.

\* cited by examiner

STOP-ROTOR ROTARY WING AIRCRAFT

CROSS-REFERENCE TO RELATED APPLICATIONS

This application is a non-provisional of and claims priority under 35 U.S.C. Section 119(e) to U.S. Provisional Application 61/094,794, filed Sep. 5, 2008. The entire content of this provisional application is hereby incorporated by reference in its entirety.

BACKGROUND

1. Field of the Invention

The invention relates generally to unmanned aircraft designs, and, more particularly, to aircraft designs that combine the features of helicopter and fixed wing aircraft.

2. Description of the Related Art

Some unmanned aircraft designs attempt to combine the vertical takeoff and landing (VTOL) and hover capabilities of a helicopter and the increased speed and range capabilities of fixed wing airplanes. Stop rotor "nose sitter" configurations, so named because the aircraft takes off and lands from a nose-down orientation, may offer good hover efficiency and aerodynamic design but can require complex mechanical systems. These designs can also suffer a significant loss in altitude during transition from helicopter to airplane mode, and involve uneven weight distributions, rendering the aircraft "top heavy" and unwieldy during takeoff and landing. Further, the counter-rotating fuselage and tail of some "nose sitter" designs are less practical than aircraft designs with a conventional fuselage orientation and tail rotor. "Tilt rotor" configurations with tiltable rotating propellers also involve mechanically complex systems and decreased hover efficiency due to higher disk loading. "Tail-sitter" designs, so named because the aircraft takes off and lands from a tail-down orientation, are associated with poor hover efficiency due to high disk loading and an awkward 90 degree attitude change between hover and forward flight modes.

The compound helicopter has a rotor system driven by an engine for takeoff, hovering, and landing and an additional propulsion system and supplemental wing independent of the rotor system. At higher speeds, the rotor system does not drive the aircraft and is substantially unloaded by the lift of the wing. Compound designs also have disadvantages: they are heavy due to additional systems and can suffer a significant download penalty when hovering due to the presence of the wing in the rotor downwash. The canard rotor wing configuration contemplates a rotor that stops in flight and acts as a fixed wing, but it too suffers drawbacks. The shape of its airfoil compromises between forward and reverse airflow directions, leading to reduced performance in both flight modes. Similarly, tilt duct designs, whose propellers are shrouded in ducts and rotate between flight modes, suffer from poor hover efficiency and high drag in forward flight mode. Thus, combining a helicopter's vertical takeoff and landing capability and efficient hover with a fixed wing aircraft's high speed and long range into one aircraft design while reducing or eliminating performance tradeoffs remains a significant aspect in aeronautical engineering.

SUMMARY OF THE INVENTION

The devices of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Preferred Embodiments," one will understand how the features of this invention provide several advantages over current aircraft designs.

One embodiment is an aircraft capable of helicopter and fixed wing flight modes. The aircraft includes a plurality of wings, each wing having a spar and a flap movable with respect to the spar; a flap actuator configured to move the flap; and a center section rotatably coupled to each spar and including at least one spar actuator. The spar actuator is configured to rotate at least one of the plurality of wings about a rotational axis of the spar when the aircraft transitions between helicopter and fixed wing flight modes.

Another embodiment is method for transitioning an aircraft between flight modes. The method includes changing the motion of a center section of the aircraft relative to a fuselage of the aircraft from a first flight mode to a second flight mode, where the direction of relative airflow over one of a plurality of wings reverses when the aircraft transitions between modes. The method also includes rotating the one of a plurality of wings such that a leading edge of the wing faces into the new direction of relative airflow.

Still another embodiment is an aircraft including means for changing the motion of a center section of the aircraft relative to a fuselage of the aircraft from a first flight mode to a second flight mode, where the direction of relative airflow over one of a plurality of wings reverses when the aircraft transitions between modes. The aircraft also includes means for rotating the one of a plurality of wings such that a leading edge of the wing faces into the new direction of relative airflow.

Further aspects, features and advantages of the present invention will become apparent from the detailed description of the preferred embodiment that follows.

BRIEF DESCRIPTION OF THE DRAWINGS

These and other features, aspects, and advantages of the present invention will now be described in connection with a preferred embodiment of the present invention, in reference to the accompanying drawings. The illustrated embodiments, however, are merely examples and are not intended to limit the invention.

DETAILED DESCRIPTION OF THE PREFERRED EMBODIMENT

The following detailed description is directed to certain specific embodiments of the invention. However, the invention can be embodied in a multitude of different ways as defined and covered by the claims. In this description, reference is made to the drawings wherein like parts are designated with like numerals throughout.

Embodiments of the invention can provide features of a helicopter and a fixed wing aircraft while reducing performance losses during transition between flight modes and during flight in helicopter and fixed wing modes. Embodiments of the invention can include one or more features such as, for example, unmanned flight, improved payload capacity, vertical takeoff and landing (VTOL) capability, efficient hover, high speed, and long range during a single flight.

In a preferred embodiment, an unmanned aircraft flies at low subsonic speeds and is capable of landing and taking off from small or restricted areas that would otherwise be inaccessible to a fixed wing aircraft. The aircraft does not require a large, heavy launching system in a preferred embodiment, unlike conventional unmanned fixed wing aircraft designs. In preferred embodiments, VTOL capability simplifies landing and eliminates the need for a conventional runway or landing arresting systems such as nets to recover the aircraft. These and other capabilities described in greater detail below allow the aircraft to be used in missions such as, but not limited to, military reconnaissance, law enforcement surveillance, intelligence gathering, payload and/or sensor delivery to a desired location, hazardous area inspections, video and photojournalism missions, and environmental monitoring.

Figure 1:
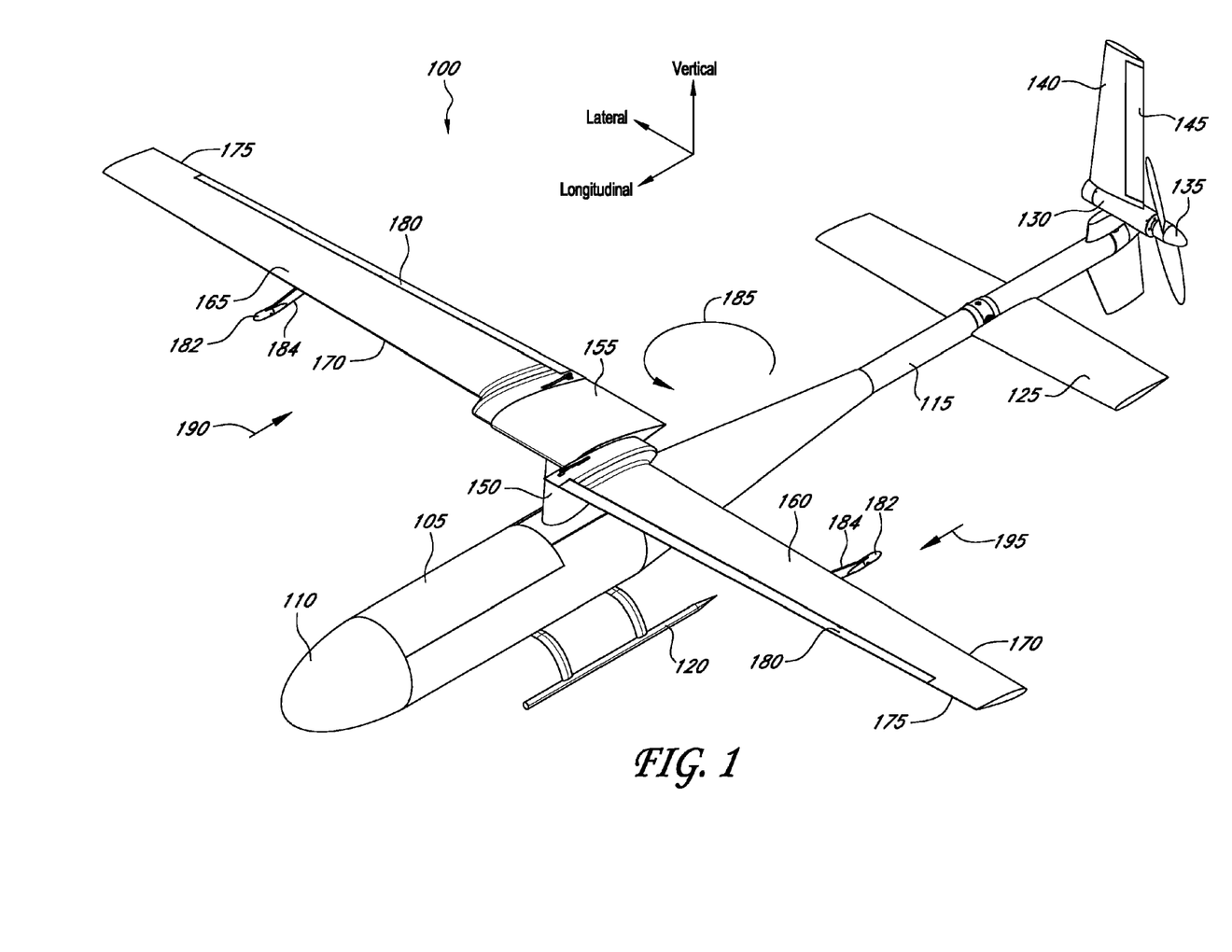
FIG. 1 is a perspective view of an aircraft according to a preferred embodiment of the present invention that converts between helicopter and fixed wing flight modes, shown in helicopter flight mode.

FIG. 1 is a perspective view of an aircraft 100 according to a preferred embodiment of the present invention. The aircraft 100 can convert between helicopter and fixed wing flight modes. The aircraft 100 comprises a fuselage, or airframe, 105 having a nose section 110, a tail section 115, and landing gear 120. The fuselage 105 may house cargo or equipment used during a mission such as, but not limited to, video and monitoring equipment, sensors, and other data collection systems. The tail section 115 optionally includes stabilizers 125. Persons of skill in the art will understand the aircraft 100 can comprise one or more conventional horizontal and/or vertical stabilizers to provide stability at high airspeeds.

In the illustrated embodiment, the tail section 115 terminates in a pivoting motor/propeller system. The motor/propeller system includes a motor 130, a tail rotor/pusher propeller 135, a vertical stabilizer 140, and a rudder 145. The tail rotor/pusher propeller 135 operates in two modes. When the aircraft 100 flies in helicopter mode as illustrated in FIG. 1, the pivoting tail system operates as a tail rotor 135. In this mode the motor 130 is perpendicular to the tail section 115 so that the tail rotor 135 is positioned to counteract torque and control yaw generated in helicopter flight mode. When the aircraft 100 flies in fixed wing mode, the pivoting tail system is configured as a pusher propeller 135. Other possible tail section configurations are described below with reference to FIGS. 7C-7D.

The aircraft 100 includes a mast fairing 150 connected to the fuselage 105. In one embodiment, the leading edge of the mast fairing 150 is streamlined to minimize drag. The mast fairing 150 supports center section 155. The center section 155 houses, for example, bearings and actuators that facilitate the conversion between flight modes. The center section 155 connects to two rotor blades or wings 160, 165. The blades/wings 160, 165 include leading edges 170 and trailing edges 175. The blades/wings 160, 165 can also include a servo control flap 180 located on the trailing edge 175. Embodiments of the blades/wings 160, 165 can also include a ballast nose weight 182 and a ballast arm 184, described in greater detail below with reference to FIG. 2.

The blades/wings 160, 165 rotate relative to the center section 155. Preferably, each blades/wings 160, 165 is an independently pivoting panel with symmetric airfoils. The blades/wings 160, 165 according to one embodiment can function as helicopter rotor blades when spinning in helicopter flight mode and serve as fixed wings when stationary in fixed wing flight mode. Systems for converting between flight modes are described in greater detail below with reference to FIGS. 2 and 3.

The aircraft 100 is illustrated in FIG. 1 in helicopter flight mode, with the blades/wings 160, 165 configured to function as helicopter rotor blades. In one embodiment of the helicopter flight mode, the center section 155 and the blades/wings 160, 165 rotate in a plane defined by longitudinal and lateral axes of the center section 155. In another embodiment of a helicopter configuration, the center section 155 and the blades/wings 160, 165 rotate in the direction indicated by an arrow 185. The leading edge 170 of the blade/wing 165 faces into the relative airflow, indicated by an arrow 190, such that air first flows over the leading edge 170 of the bade/wing 165, then over the trailing edge 175. Similarly, the leading edge 170 of the blade/wing 160 faces into the relative airflow, indicated by an arrow 195, such that air flows first over the leading edge 170 of the blade/wing 160, then over the trailing edge 175.

Figure 2:
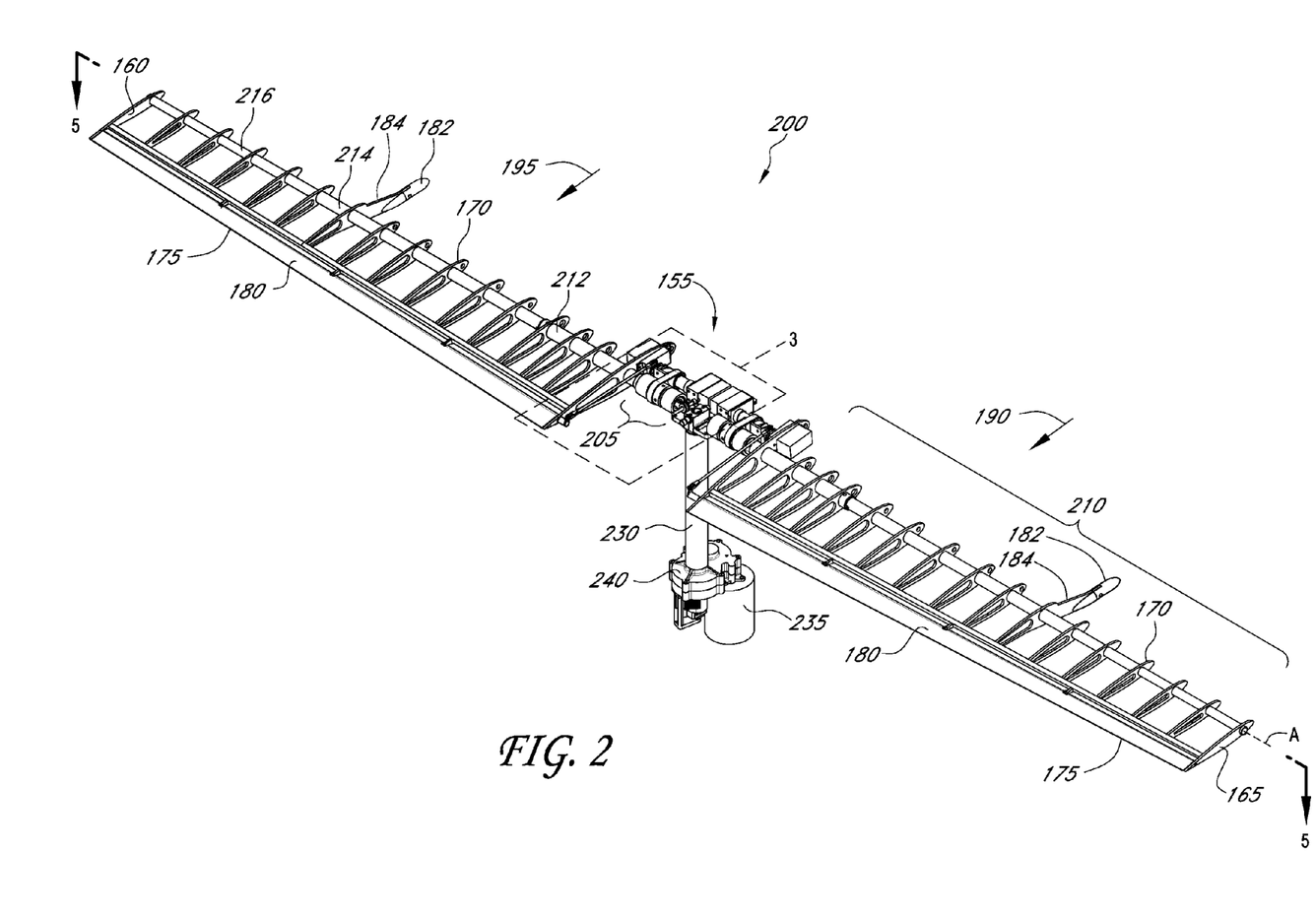
FIG. 2 is a perspective view of a blade/wing system from the aircraft of FIG. 1, shown in fixed wing flight mode with its outer skin removed.

FIG. 2 is a perspective view of a blade/wing system 200 from the aircraft 100 of FIG. 1, shown in fixed wing flight mode with its outer skin removed. In the fixed wing flight mode the blades/wings 160, 165 function as fixed wings. In one embodiment of the aircraft 100 in an example fixed wing configuration, the center section 155 and the blades/wings 160, 165 do not rotate in the plane defined by longitudinal and lateral axes of the center section 155. In this configuration, the leading edge 170 of the blade/wing 165 faces into the relative airflow, indicated by the arrow 190, such that air first flows over the leading edge 170 of the blade/wing 165, then over the trailing edge 175. Similarly, the leading edge 170 of the blade/wing 160 faces into the relative airflow, indicated by the arrow 195, such that air flows first over the leading edge 170 of the blade/wing 160, then over the trailing edge 175. The blades/wings 160, 165 can also include servo control flaps or flaps 180, located on the trailing edge 175 of the blades/wings.

In the illustrated embodiment, each blade/wing 160, 165 is connected to one or more bearings 205. The bearings 205 allow each blade/wing 160, 165 to rotate, feather, and/or pitch about a rotational axis A of a wing spar 210. In another embodiment, the aerodynamic center of the blades/wings 160, 165 is aft of the rotational axis A, such that the blades/wings 160, 165 tend to feather or pitch into the relative airflow. Thus, the location of the aerodynamic center of the blades/wings 160, 165 aft of the rotational axis A according to one embodiment allows the blade/wing 160, 165 to self-feather. When the center section 155 of the aircraft 100 is spinning in helicopter flight mode, aerodynamic forces cause one of the blades/wings to pitch over into the relative airflow. In the embodiment illustrated in FIG. 1, for example, the blade/wing 160 has rotated about the rotational axis A of the spar 210 such that the leading edge 170 faces into the relative airflow, indicated by the arrow 195. When the center section 155 of the aircraft 100 is not spinning in fixed wing flight mode, aerodynamic forces cause one of the blade/wings to pitch over into the new relative airflow. In the embodiment illustrated in FIG. 2, for example, the blade/wing 160 has rotated about the rotational axis of the spar 210 such that the leading edge 170 faces into the new relative airflow, indicated by the arrow 195. Alternatively, the blade/wing 165 pitches or flips over into the relative airflow. In one embodiment, the center section 155 includes an aerodynamic fairing that is optimized for one blade/wing to maintain the same orientation during helicopter and fixed wing flight modes, while the other blade/wing changes orientation between flight modes and pitches or flips into the relative airflow during flight mode transitions. In another embodiment, the structure, design, and/or components of the non-flipping blade/wing are simplified to decrease the weight of the aircraft 100. In yet another embodiment, either blade/wing 160, 165 is capable of flipping over into the new direction of relative airflow during transition between flight modes.

In one embodiment of the present invention, one blade/wing 160, 165 will pivot or flip into the wing configuration best suited for a particular flight mode based on the relative airflow, without input from an actuator or control system of the aircraft 100. Thus, a change in relative airflow alone can cause one blade/wing 160, 165 to flip over into the relative airflow. Either the blade/wing 160 or the blade/wing 165 can flip into the relative airflow. For example, the blade/wing 160 can rotate approximately 180 degrees about the rotational axis A of the spar 210. In another embodiment, the bearings 205 and the aerodynamic center of the blades/wings 160, 165 located aft of the rotational axis A allow the blades/wings 160, 165 to pitch or flip into a new flight mode configuration based on the direction of the relative airflow. In yet another embodiment, one blade/wing 160, 165 will pivot or flip into the wing configuration best suited for a particular flight mode based on an input from an actuator or control system of the aircraft 100. For example, in one embodiment, a blade root actuator described in greater detail below causes one blade/wing 160, 165 to flip into the helicopter or fixed wing flight mode. In another embodiment, various forces drive the flipping motion of the blade/wing 160, 165 at different times as the blade/wing rotates into a new flight mode configuration. In one example, aerodynamic forces associated with a new direction of relative airflow drive the flipping motion of one blade/wing 160, 165 during part of the blade/wing's rotational movement and the blade root actuator 220 drives the blade/wing during another part of the blade/wing's rotational movement. Embodiments of actuator and control systems are discussed in greater detail below with reference to FIG. 3.

In one aspect of the present invention, the wing spar 210 is a nesting tube spar comprising sections with different diameters. For example, a main wing spar 212 has a first diameter, a central wing spar 214 has a second diameter less than the first diameter, and an end wing spar 216 has a third diameter less than the second diameter. Persons of skill in the art will understand that the wing spar 210 may be composed of one or more sections, such as but not limited to 1, 2, 3, 4, and 5 sections, and that the sections may have the same or different diameters. It will also be understood that the wing spar 210 is not limited to a nesting tube spar and can comprise one spar of a constant diameter. Further, the cross-sectional profile of the wing spar 210 can change or remain the same along its length. The wing spar 210, and sections thereof, can be made of any suitable material, including but not limited to carbon fiber. In one embodiment, for example, the wing spar 210 is a molded carbon fiber spar that transitions from a circular cross-section inside a spar tube liner 280 (described in greater detail with reference to FIG. 3) to a tapered I-beam cross-section along the length of the blade/wing 160, 165.

Embodiments of the present invention can also include a ballast nose weight 182 and a ballast arm 184 connected to the wing spar 210. In one embodiment, the ballast nose weight 182 provides dynamic stability to the aircraft 100 in helicopter flight mode, ensuring the inertial forces associated with various blade/wing motions are in balance and within desired ranges. In another embodiment, rotational inertia associated with a conventional blade weight is minimized by positioning the ballast nose weight 182 on a ballast arm 184 that is aerodynamically shaped to minimize the drag penalty. In yet another embodiment, the ballast arm 184 is angled down. In still another embodiment, the ballast arm 184 is angled down such that the chordwise centrifugal force component on the ballast nose weight 182 tends to pull the blade/wing 160, 165 to near hover pitch when the blades/wings 160, 165 are spinning, thereby reducing control loads. In one embodiment, near hover pitch is a pitch of approximately 6 degrees. Persons of skill in the art will understand embodiments of the present invention that do not include an angled ballast arm are possible, and could include a blade root actuator 220 of increased size and power to provide a nose-up moment to the blades/wings 160, 165 when the aircraft 100 is hovering in helicopter flight mode.

In some embodiments of the present invention, the aircraft 100 includes an electric drive system that can quickly and efficiently stop the spinning blades/wings 160, 165 when transitioning from the helicopter to the fixed wing flight mode, as well as quickly and efficiently accelerate the blades/wings 160, 165 to full speed rotation when transitioning from the fixed wing to helicopter flight mode. The ability to quickly stop and/or accelerate the blades/wings 160, 165 reduces the disturbance of and deviations in the flight path of the aircraft 100 during conversions between flight modes. For example, the aircraft 100 can complete conversion between flight modes in less than 2 seconds. In another example embodiment, the aircraft 100 transitions between flight modes in approximately 1 second. The electric motor drive system according to some embodiments will now be described in greater detail.

The blade/wing system 200 includes a blade/wing mast 230 connected to the center section 155 through a blade/wing hub 325, described in greater detail with reference to FIG. 4. The mast 230 is connected to a drive motor 235 through a drive transmission 240. The transmission 240 can reduce the speed of the drive motor 235 and provide sufficient torque to spin the blade/wing system 200. The transmission 240 can also support mast bearings and a slip ring assembly. In one embodiment, a microcontroller provides power and control signals to the transmission 240, and the transmission 240 can send power and control signals to the microcontroller.

The drive motor 235 provides power to spin and stop the blade/wing system 200. In one embodiment, the motor 235 is a permanent magnet brushless motor. In another embodiment, the drive motor 235 is controlled by a four quadrant current mode motor controller which has the ability to drive the blade/wing system 200 as well as quickly and precisely stop the system's rotation during a conversion of the aircraft 100 from helicopter to fixed wing flight mode, or vice versa. In one embodiment, the electric drive system of the aircraft 100 allows the aircraft 100 to convert between flight modes in approximately 1 second. Persons of skill in the art will understand that any suitable drive transmission, transmission microcontroller, drive motor, and motor controller capable of driving and stopping the blade/wing system 200 known in the art can be used and still fall within the scope of the invention.

Figure 3:
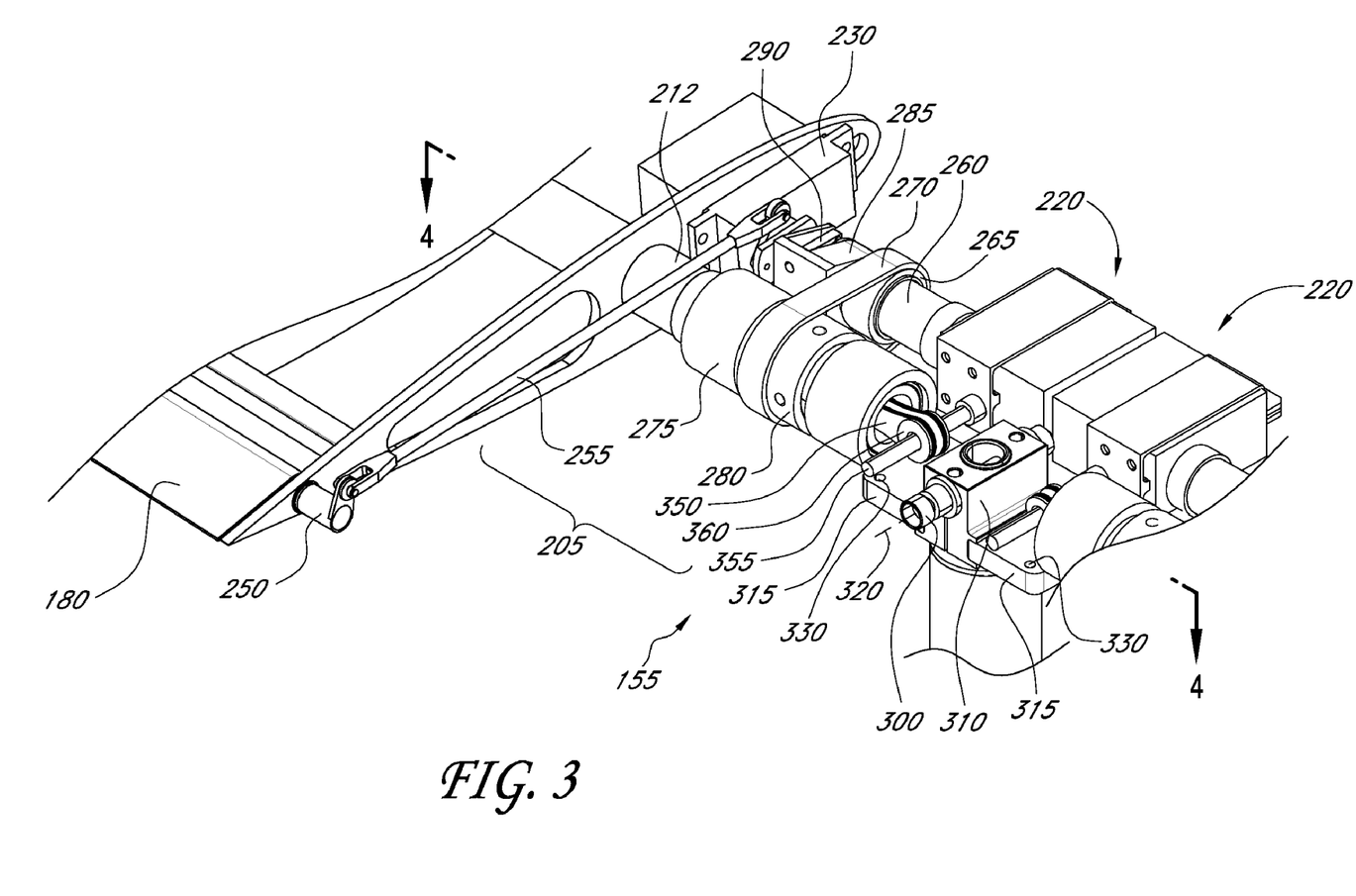
FIG. 3 is an enlarged partial perspective view of the servo control system and the center section of the blade/wing system of FIG. 2.

FIG. 3 is an enlarged perspective view of a servo control system and the center section 155 of the blade/wing system 200 of FIG. 2. As described briefly above with reference to FIG. 1, the blades/wings 160, 165 can include servo control flaps or flaps 180 located on the trailing edges 175 of the blades/wings. The servo control flaps 180 include servo flap control horns 250, which are connected to a servo flap control link 255. The servo flap control link 255 is connected to a servo flap actuator or flap actuator 230. In a preferred embodiment, the servo flap actuator 230 is an electromechanical servo. In another embodiment, the servo flap actuator 230 is a piezo actuator.

In one embodiment, the servo flap actuator 230 controls the angle of the servo control flap 180 with respect to the blade/wing 160, 165. The servo flap actuator can include, but is not limited to, a high speed electromechanical servo or a piezo actuator that can achieve cyclic pitch control of the blade/wing 160, 165. In another embodiment, the servo control flap 180 indirectly controls the cyclic pitch of the blade/wing 160, 165. In yet another embodiment, the use of the servo flap actuator 230 to control the servo control flap 180 significantly reduces the amount of actuator torque required to control the cyclic pitch of the blade/wing 160, 165. Thus, unlike conventional designs that use an actuator to rotate the entire blade/wing, embodiments of the present invention include a servo control flap 180 that reduces the amount of actuator torque required for cyclic pitch control. In a preferred embodiment, the servo control flap 180 can complete an oscillation at the same speed as the rotation of the blade/wing 160, 165. For example, in one embodiment, the servo control flap 180 oscillates at 12 hertz or once per revolution of the blade/wing ("one per rev") to achieve cyclic pitch control of the aircraft in hover. In another embodiment, the servo flap 180 oscillates twice per revolution to reduce "two per rev" vibrations that occur with two bladed rotors.

Blade/Wing Actuator and Control Systems

The center section 155 includes one or more blade root actuators, or spar actuators, 220. In the embodiment illustrated in FIG. 3, two blade root actuators 220 are provided. In one embodiment, the blade root actuator 220 is an electromechanical servo. The blade root actuators 220 according to one embodiment have a high bandwidth and an electronic feedback control system configured to hold the blades/wings 160, 165 at a desired pitch position in helicopter and fixed wing flight modes. In one example embodiment, actuator power and control is provided by a slip ring assembly. The slip ring assembly can transmit electrical power and/or communication signals between the airframe and the spinning blade/wing system.

According to one aspect of the present invention, the blade root actuator 220 is connected to a blade root spring 260. In one embodiment, the blade root spring 260 is a torsionally flexible element such as, but not limited to, a spring. The blade root spring 260 can be made of any suitable material including, but not limited to, steel. The blade root spring 260 is connected to a blade root pinion 265. A belt 270 transfers torque between the blade root pinion 265 and a blade root pulley 275. In the illustrated embodiment, a spar tube liner 280 connects the belt 270 to the blade root pulley 275. The blade root pulley 275 is connected to the wing spar 210. In the embodiment illustrated in FIG. 3, the blade root pulley 275 is connected to the main wing spar 212. As described above with reference to FIG. 2, the main wing spar 212 is connected to the central wing spar 214, which is connected to the end wing spar 216.

The blade/wing actuator system may also include a housing 285 for bearings (not shown) which support the blade root pinion 265 and allow it to rotate freely. A hall effect angle sensor 290 may also be connected to the housing 285. The hall effect angle sensor 290 is discussed in greater detail below with reference to FIG. 5. In one embodiment, the belt 270 transmits torque from the blade root actuator 220 to the blade root pulley 275. The blade root pulley 275 is connected to the wing spar 210. The belt 270 therefore also transmits torque from the blade root actuator 220 to the wing spar 210, and thus to the blade/wing 160, 165 itself.

In certain embodiments, the blade root actuator 220 controls the collective pitch of the blade/wing 160, 165 though the torsionally-flexible blade root spring 260. Thus, the blade root actuator 220 can be primarily responsible for thrust control in helicopter flight mode and wing incidence or lift control in fixed wing flight mode. The blade root spring 260 according to one aspect provides flexibility to the blade/wing actuator system, such that the servo control flap 180 can independently control the cyclic pitch of the blade/wing 160, 165, without causing the blade/wing 160, 165 to move the blade root actuator 220. For example, in one embodiment, the servo flap actuator 230 moves the servo control flap 180 on the blade/wing 160, 165 as it rotates in the helicopter flight mode, thus generating a moment at the servo control flap 180. This moment can cause the blade/wing 160, 165 to rotate. This blade/wing 160, 165 rotation can cause the blade root actuator 220 to rotate. The blade root spring 260 according to some embodiments can dampen the transmission of the servo-flap-induced rotation of the blade/wing 160, 165 to the blade root actuator 220, such that the blade/wing 160, 165 can respond to changes in the orientation of the servo control flap 180 without the full degree of that response being transmitted to the blade root actuator 220.

The blade root actuator 220 according to some embodiments can control all or a portion of the flipping motion of one blade/wing 160, 165 as the aircraft 100 transitions between flight modes. In one example, different forces act on the blade/wing 160, 165 as it pitches or flips into the relative airflow. Thus, different forces can drive the flipping motion of the blade/wing 160, 165 at different times as it rotates into a new flight mode configuration. In one embodiment, for example, aerodynamic forces associated with a new direction of relative airflow drive the flipping motion of one blade/wing 160, 165 during a first part of the blade/wing's rotational movement and the blade root actuator 220 drives the blade/wing during a second part of the blade/wing's rotational movement. In another embodiment, the aerodynamic stability of the blade/wing 160, 165 contributes to the natural tendency of the blade/wing 160, 165 to flip into the new direction of relative airflow, and reduces the work required of the blade root actuator 220 to flip the blade/wing 160, 165. It will be understood that configurations other than those just described are possible, and that the aerodynamic stability of the blade/wing and the blade root actuator 220 can act in parallel in a seamless fashion to rotate the blade/wing to a desired position into the relative airflow.

In one embodiment, the blade root actuator 220 and the servo flap actuator 230 work in parallel. In another embodiment, the blade root actuator 220 and the servo flap actuator 230 work independently. In yet another embodiment, the collective pitch of the aircraft 100 is controlled using a high-torque, low-speed actuator, such as but not limited to the blade root actuator 220, and the cyclic pitch of the aircraft 100 is controlled using a low-torque, high-speed actuator, such as but not limited to the servo flap actuator 230. This is in contrast to conventional rotor systems, which use a swashplate and a minimum of three airframe-mounted actuators to transmit control signals to, and control the motion of, the blades. A configuration comprising the servo flap actuator 230 and the blade root actuator 220 offers several advantages, including but not limited to lower actuator weight, less actuator power consumption, lower stresses on the actuator transmissions, and camber control for fixed wing flight mode to reduce efficiency losses associated with symmetric airfoils as opposed to cambered airfoils. According to one embodiment, the same flight control elements, including but not limited to the servo flap actuator 230 and the blade root actuator 220, are used for flight control in both helicopter and fixed wing flight modes. In another embodiment, the servo flap actuator 230 and the blade root actuator 220 control the angle of the blades/wings 160, 165 with respect to the center section 155, and control the roll moment and lift of the blades/wings 160, 165 in both the helicopter and fixed wing flight modes. In yet another embodiment, the blade root actuator 220 provides control when the relative air velocity is too low for the servo control flap 180 to be effective, such as when the center section 155 is in transition between stopped and full speed or full speed and stopped modes.

In one embodiment of the present invention, a plurality of servo flap actuators 230 are connected to each blade/wing 160, 165 and directly control the cyclic pitch of each blade/wing 160, 165. Use of servo flap actuators as described herein can significantly reduce the weight of the aircraft 100 and provide more efficient control systems due to the mechanical advantages associated with servo control surfaces. In another embodiment of the present invention that does not comprise the blade root spring 260 or servo flap actuators 230, a direct control configuration includes one blade root actuator 220 connected to each blade/wing 160, 165, with one actuator controlling the cyclic and collective pitch of one blade/wing 160, 165. In yet another embodiment, the cyclic and collective pitch of the blades/wings 160, 165 is directly controlled by one or more actuators located in the center section 155, the mast 230, or in the blade/wing 160, 165 itself. Embodiments of the aircraft 100 comprising blades/wings 160, 165 whose cyclic and collective pitch is directly controlled by an actuator may be mechanically simpler, offer reduced drag and weight due to the absence of hinged surfaces, and/or allow more precise control during conversion between flight modes, at the expense of increased actuator weight and power consumption.

Persons of skill in the art will understand the blade/wing actuator system described herein is not limited to the specific embodiments just described. Thus, one or more blade/wing actuator systems, with one or more blade wing actuators 220, blade root springs 260, belts 270, et cetera, can be provided for each blade/wing 160, 165. In addition, any suitable component which can perform the function described herein can be used in the blade/wing actuator system without departing from the scope of the invention. Thus, for example, where a blade root spring 260 is described herein, any torsionally flexible element can be used in the system(s) to allow the servo flap actuator 230 and the blade root actuator 220 to independently control cyclic and collective pitch. Similarly, for example, where a belt 270 is described herein, any torque-transmitting element can be used in the system(s) to transmit torque from the blade root actuator 220 to the blade/wing 160, 165.

Flap or Teeter Control System

The center section 155 of the illustrated embodiment includes a teeter pin 300 disposed in a hub block 310. Snubber blocks 315 are connected to the hub block 310. The snubber block 315 is connected to a blade/wing hub 325, which is described in greater detail below with reference to FIG. 4. The snubber block 315 is connected to the blade/wing hub 325, for example, by connectors (not shown) disposed in snubber block holes 330.

In some embodiments, the teeter pin 300 allows the blade/wing 160, 165 to flap or tilt restrained by the snubber blocks 315. The direction of flap or teeter motion in one embodiment is about a longitudinal axis of the aircraft 100. In another embodiment, the direction of flap or teeter motion is about a longitudinal axis 320 of the teeter pin 300. In one embodiment, the difference in lift between the blades/wings 160, 165 creates a moment about the teeter pin 300. This moment causes the blade/wings 160, 165 to tilt or teeter with respect to the teeter pin 300. A closed loop control system according to one embodiment of the present invention indirectly controls the magnitude and the phase of the teeter motion with respect to the airframe by adjusting the servo control flaps 180 to achieve the desired teeter magnitude and phase. In one embodiment, the closed loop control system controls both the magnitude and the phase of the teeter motion. Thus, to pitch the aircraft 100 forward in one example, the closed loop control system adjusts the cyclic motion of the servo control flaps 180 to achieve a desired angle of forward and/or sideward tilt of the blade/wing system with respect to the airframe. In another example, the closed loop control system can rotate the servo control flaps 180, thereby varying the pitch or feather angle of the blades/wings 160, 165 with respect to the blade/wing hub 325, and generate aerodynamic moments that control the difference in lift between the blades/wings 160, 165. Control of the flap or teeter motion is therefore achieved in one embodiment by sensing the amount of flap or teeter motion at the teeter pin 300, then rotating the servo control flaps 180 to dampen, minimize, or eliminate the teeter motion. This teeter control system is a closed loop system according to one embodiment of the present invention, with the system continuously and automatically adjusting the servo control flaps 180 in response to an observed teeter motion. Persons of skill in the art will understand the aircraft 100 need not comprise a teeter control system, or can comprise an open-loop teeter control system.

In accordance with one embodiment of a teeter control system, changing the mechanical properties of the snubber block material can allow the blade/wing flap stiffness to be adjusted, thereby changing the flight dynamic characteristics of the aircraft 100. Snubber block mechanical properties that can be adjusted to alter flight dynamics include, but are not limited to, hardness, stiffness, and elasticity. The snubber block 315 can be made of any suitable material, such as but not limited to polyurethane. In one embodiment, the material of the snubber blocks 315 is chosen to provide additional stiffness to the blade/wing system described herein.

The high speed closed loop teeter control system according to one embodiment of the present invention can improve aircraft performance in high wind conditions. The teeter control system described herein can also facilitate the conversion between flight modes. In one embodiment, as the rotation of the blades/wings 160, 165 slows during a conversion from helicopter to fixed wing flight mode, the asymmetry in aerodynamic flow conditions between the two blades/wings 160, 165 increases, causing a flap or teeter motion that is minimized by the closed loop teeter control system. The closed loop teeter control system according to some embodiments of the present invention can minimize or eliminate the increased flap motion and hold the blades/wings 160, 165 level during transition from the helicopter flight mode to the fixed wing flight mode, or vice versa.

The aircraft 100 can include a strap pack 350 connected to a strap pack bolt 355. A fitting 360 connects the strap pack 350 to the strap pack bolt 355. The strap pack 350 will be described in greater detail below with reference to FIGS. 5 and 6. The strap pack bolt 355 is retained in one embodiment by the blade/wing hub 325. In one embodiment, the strap pack bolt 355 retains the strap pack 350, and therefore the blade/wing 160, 165, to the center section 155. Thus, the strap pack bolt 355 can carry the strap pack 350's centrifugal force load in shear as the blade/wing 160, 165, and therefore the strap pack 350, rotate in the helicopter flight mode.

Figure 4:
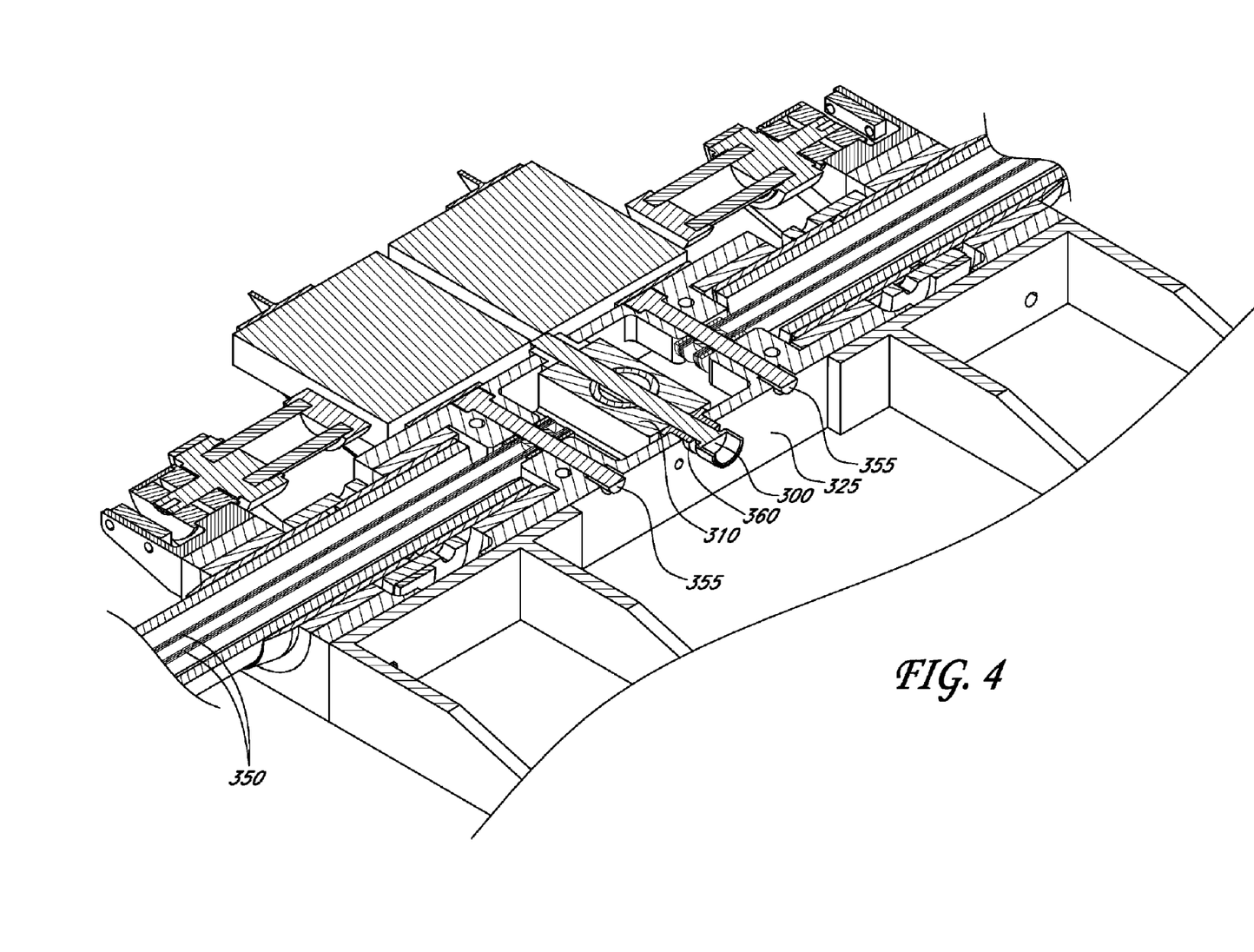
FIG. 4 is a cross-sectional, perspective view through the center section taken along line 4-4 of FIG. 3.

FIG. 4 is a cross-sectional, perspective view of the center section of FIG. 3 taken along line 4-4. In one embodiment, the blade/wing hub 325 can connect the blades/wings 160, 165 to the mast 230. The blade/wing hub 325 can also transmit motor torque required for rotation or spinning of the blades/wings 160, 165 and resist the lift load of the blades/wings 160, 165. In another embodiment, the strap pack bolts 355 and the teeter pin 300 are disposed in the blade/wing hub 325. The blade/wing hub 325 can support the strap pack bolts 355 as they carry the strap pack 350's centrifugal force load in shear. In addition, the blade/wing hub 325 can support the teeter pin 300 through, for example, a teeter bearing 360. In one embodiment, the hub block 310 and the blade/wing hub 325 connect the teeter pin 300 to the mast 230. In addition, as described in greater detail above with reference to FIG. 3, the blade/wing hub 325 can support the snubber blocks 315.

Strap Pack

Figure 5:
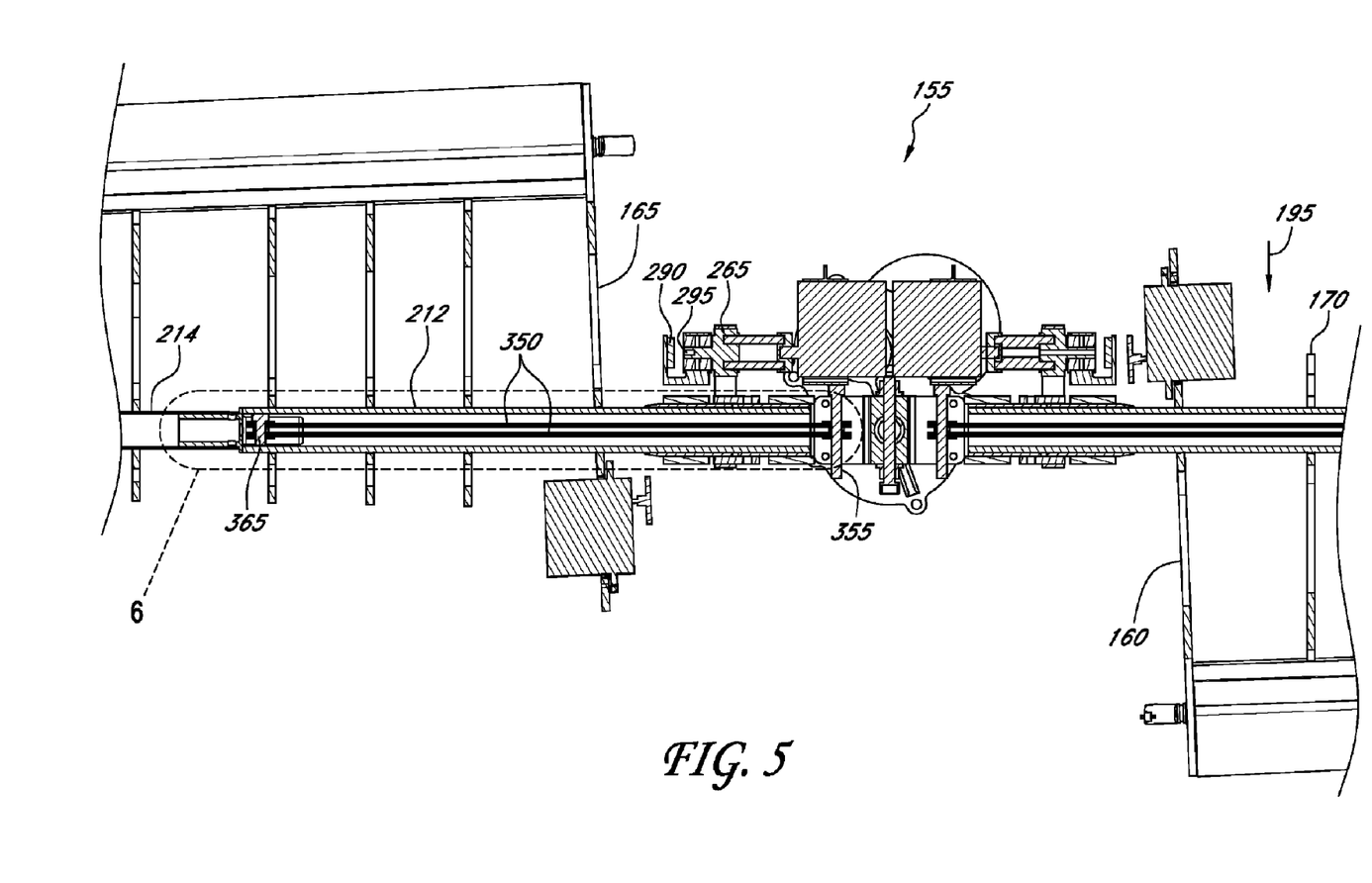
FIG. 5 is a cross-sectional view through the blade/wings, the strap pack, and the center section of the blade/wing system taken along line 5-5 of FIG. 2 but shown in helicopter flight mode.

FIG. 5 is a cross-sectional view of the blade/wings 160, 165, the strap pack 350, and the center section 155 of the blade/wing system 200 of FIG. 2, taken along line 5-5. The blade/wing 160 in FIG. 2 has been rotated in FIG. 5, however, such that the aircraft 100 is shown in helicopter flight mode with the leading edge 170 of the blade/wing 160 facing into the relative airflow, indicated by the arrow 195. The center section 155 according to one embodiment includes two blade/wing actuator systems, one for each blade/wing 160, 165. In addition, the center wing spar 214 has a smaller diameter than that of the main wing spar 212, as described in greater detail above with reference to FIG. 2. In addition, the strap pack 350 according to one embodiment extends from the strap pack bolt 355, through the main wing spar 212, and to a spar bolt 365 at the distal end of the main wing spar 212.

In some aspects of the present invention, the center section 155 includes the hall effect angle sensor 290. The hall effect angle sensor 290 senses the angle of a magnet 295 attached to the blade root pinion 265. In one embodiment, the hall effect angle sensor 290 determines the pitch angle of the blade/wing 160, 165 with respect to the blade/wing hub 325 (not shown). In another embodiment, the magnet 295 is diametrically magnetized, such that the hall effect angle sensor 290 detects the angle of the magnetic field of the magnet 295, forming a non-contact angle sensing system. In yet another embodiment, potentiometers are used to determine pitch angle of the blade/wing 160, 165. The hall effect angle sensor and magnet system according to one embodiment is more resistant to vibration and has a longer lifespan than potentiometers.

Figure 6:
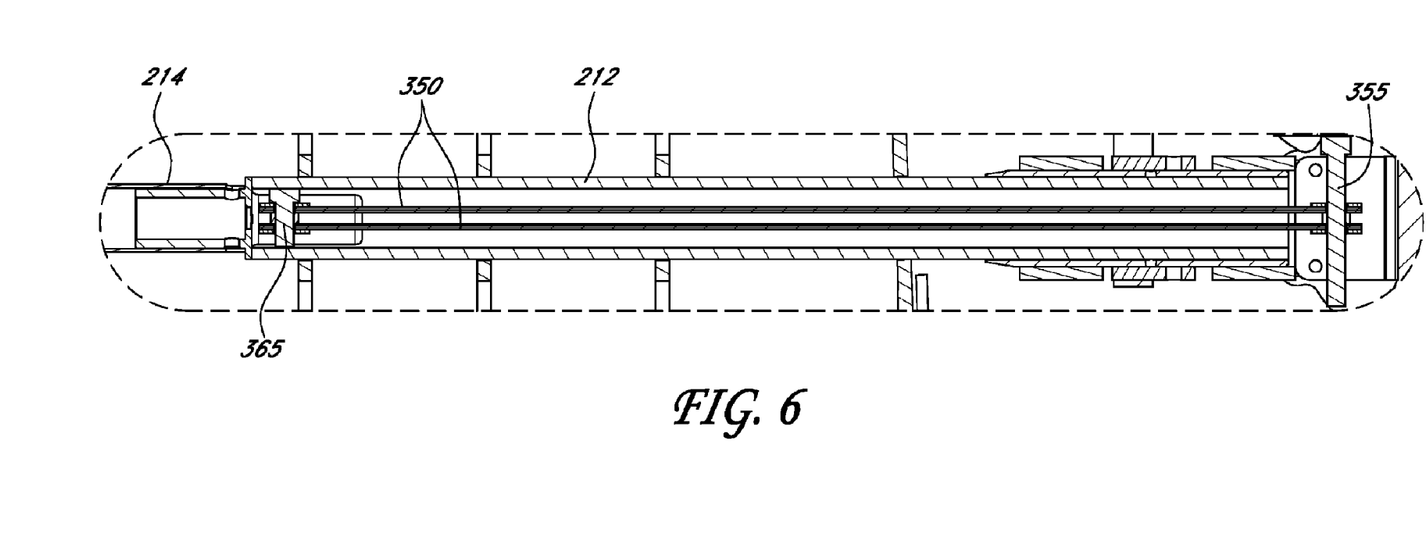
FIG. 6 is an enlarged view of the strap pack of FIG. 5.

FIG. 6 is an enlarged view of the strap pack 350 of FIG. 5. The strap pack 350 inhibits axial motion of the blade/wing 160, 165 but is torsionally flexible to allow the blade/wing 160, 165 to rotate in pitch or feather. Thus, as the blades/wings 160, 165 pitch or flip to face into the relative airflow in the helicopter or fixed wing flight mode, and/or as the blade root actuator 220 rotates the blade/wing 160, 165, the strap pack 350, retained by the bolts 355, 365, twists inside the main spar tube 212. The strap pack may be composed of any suitable material, including but not limited to thin steel plates. The thin steel plates may be coated with a low friction coating so the steel plates can slide freely as the pack is twisted.

In one embodiment of the present invention, the strap pack 350 provides a 90 degree pre-pitch moment to the blade/wing 160, 165, such that the blade/wing 160, 165 moves to a leading edge up orientation in the absence of, for example, actuator or aerodynamic forces. In one embodiment, the same 90 degree pre-pitch moment is applied to the blades/wings 160, 165 in both the helicopter and fixed wing flight modes. This reduces actuator loads required in both flight modes, during which the aerodynamic stability of the blades/wings 160, 165 and inertial forces, such as the centrifugal restoring moment, cause the leading edges of the blades/wings 160, 165 to transition from a leading edge up orientation to a horizontal orientation facing into the direction of relative airflow. Persons of skill in the art will understand that embodiments are not limited to the strap pack 350 described herein, and any suitable torsion spring that can move and/or hold the blades/wings 160, 165 to an approximately 90 degree leading edge up orientation can be used. The pre-pitch moment applied by the strap pack 350 to the blade/wing 160, 165 is described in greater detail with reference to FIG. 7A.

As described above, FIGS. 5 and 6 illustrate the blades/wings 160, 165 in the helicopter flight mode, with the leading edges 170 of the blades/wings 160, 165 facing into the direction of relative airflow, such that the blades/wings 160, 165 are substantially parallel to the ground. Solely for purposes of description, however, FIGS. 5 and 6 illustrate the strap pack 350 when the blades/wings 160, 165 are in a leading edge up orientation, such that the strap pack 350 is not twisted inside the main spar tube 212. Persons of skill in the art will understand that when the aircraft 100 is in helicopter or fixed wing flight mode, the strap pack 350 will be twisted inside the main spar tube 212.

Aircraft Operational Modes

Figure 7A:
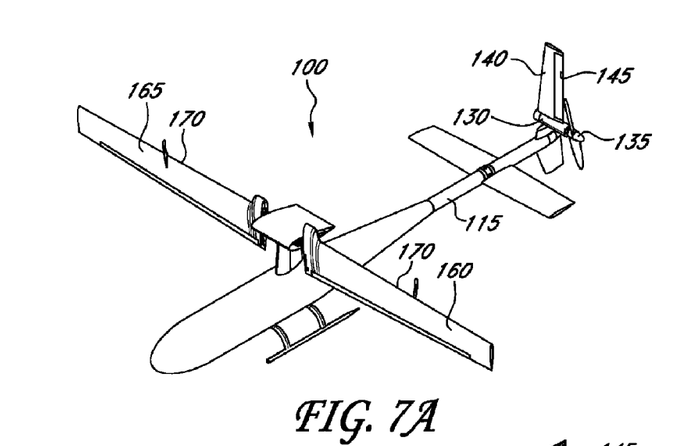
FIGS. 7A, 7B, 7C, and 7D are perspective views of the aircraft of FIG. 1, shown in blade/wing-stopped helicopter mode, hover/low speed helicopter mode, fixed wing mode, and high speed helicopter mode, respectively.

FIGS. 7A, 7B, 7C, and 7D are perspective views of the aircraft 100 of FIG. 1, shown in blade/wing-stopped helicopter mode, hover/low speed helicopter mode, fixed wing mode, and high speed helicopter mode, respectively. FIG. 7A illustrates the aircraft 100 with the blades/wings 160, 165 stopped and in a leading edge up orientation. The leading edges 170 of the blades/wings 160, 165 are oriented upward and the blades/wings 160, 165 are substantially perpendicular to the ground. As discussed in greater detail above with reference to FIG. 6, the strap pack 350 according to one embodiment provides an approximately 90 degree pre-pitch moment to one or more of the blades/wings 160, 165. This pre-pitch moment applied by the strap pack 350 can cause one or both blades/wings 160, 165 to move to the leading edge up orientation illustrated in FIG. 7A.

Thus, in one embodiment, one or more of the blades/wings 160, 165 move to the leading edge up orientation illustrated in FIG. 7A when the blades/wings 160, 165 are stopped in the helicopter flight mode. In another embodiment, one or more of the blades/wings 160, 165 move to the leading edge up orientation in the absence of aerodynamic forces, such as for example, before takeoff and after landing when the aircraft 100 is not in flight. In yet another embodiment, one or more of the blades/wings 160, 165 move to or pass through the leading edge up orientation when the aircraft 100 transitions between flight modes and the relative airflow over the leading edges 170 changes. In one embodiment, one or more of the blades/wings 160, 165 overcome the pre-pitch moment applied by the strap pack 350 and pitch over into the new direction of relative airflow when the aircraft 100 completes its transition to the new flight mode. In another example embodiment, inertial forces, such as the centrifugal restoring moment, and the aerodynamic stability associated with a blade having an aerodynamic center aft of the rotational axis A, cause the blades/wings 160, 165 to rotate from a leading edge up orientation into a horizontal orientation facing into the direction of relative airflow. These forces can act to pull the blades/wings 160, 165 into a horizontal orientation during pre-flight startup of the aircraft and during transition between flight modes. In one embodiment during which the aircraft 100 is grounded and started in helicopter flight mode, the blades/ wings 160, 165 and the center section 155 begin to spin. Forces associated with the aerodynamic stability of the blade/ wings and centrifugal restoring force begin to rotate the blades/wings 160, 165 into a horizontal orientation. One or more blade root actuators 220 then rotate one or more blades/ wings 160, 165 during a final part of the rotation to a horizontal orientation. In one embodiment, using the blade root actuator to complete the rotational movement, as opposed to using the actuator to drive the entire rotational movement, conserves actuator power and reduces actuator wear.

In one embodiment, the pre-pitch moment applied by the strap pack 350 reduces actuator loads on the servo flap actuator 230 and the blade root actuator 220 in normal flight conditions during both helicopter and fixed wing flight modes. In another embodiment, applying the same pre-pitch moment to the blade/wings 160, 165 during both helicopter and fixed wing flight modes improves aerodynamic efficiency by reducing or eliminating the need for a control surface reflex, or trailing edge up orientation, in most flight conditions. In yet another embodiment, the pre-pitch moment applied by the strap pack 350 minimizes control surface deflection and the trim drag that results from such deflections. In still another embodiment, the strap pack 350 and the pre-pitch moment it applies prevents the blades/wings 160, 165 from twisting components running from the center section 155 to the servo flap actuator 230, such as but not limited to wires or conductors, by not allowing the blades/wings 160, 165 to complete a 360 degree rotation, thus eliminating the need for mechanical stops.

Persons of skill in the art will understand one or more blades/wings 160, 165 can be in the leading edge up orientation for a very short time, including but limited to half a second, three-quarters of a second, 1 second, 2 seconds, and 3 seconds, or an extended period of time while the aircraft 100 is not flying. In one embodiment, one or more of the blades/ wings 160, 165 are in the leading edge up orientation as the aircraft 100 transitions between flight modes, such as the helicopter flight mode to the fixed wing flight mode. The time to transition between flight modes according to one embodiment can include, but is not limited to half a second, three-quarters of a second, 1 second, 2 seconds, 3 seconds, 4 seconds, and 5 seconds. In another embodiment, one or more of the blades/wings 160, 165 quickly transit through the leading edge up orientation during the transition between flight modes. It will be understood that while FIG. 7A illustrates both blades/wings 160, 165 in the leading edge up orientation, in one embodiment only one blade/wing 160, 165 is in the leading edge up orientation during transition between flight modes.

Figure 7B:
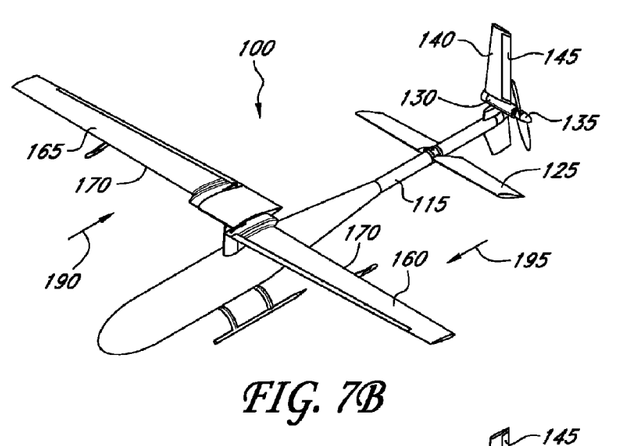

FIG. 7B illustrates the aircraft 100 in a hover/low speed helicopter flight mode according to one embodiment. The blades/wings 160, 165 are substantially parallel to the ground and rotating such that the leading edges 170 of the blades/ wings 160, 165 face into the relative airflow, indicated by the arrows 190, 195. As described above with reference to FIG. 1, the tail section 115 can terminate in a pivoting motor/propeller system that includes the motor 130, the tail rotor/pusher propeller 135, the vertical stabilizer 140, and the rudder 145. The pivoting tail system can include a tail rotor 135 when the aircraft 100 flies in the hover/low speed helicopter flight mode illustrated in FIG. 7B. In one embodiment of the hover/ low speed helicopter flight mode, the motor 130 is perpendicular to the tail section 115 and the tail rotor 135 is positioned to counteract torque and yaw motion generated in the helicopter flight mode. Embodiments of the hover/low speed helicopter flight mode can also include a pivoting tail stabilizer 125. In the embodiment illustrated in FIG. 7B, for example, the tail stabilizer 125 is pivoted or pitched nose up approximately 35 degrees. In another embodiment, the pitch of the tail stabilizer 125 is a function of airspeed to minimize the download and aircraft pitching moment. Persons of skill in the art will understand the tail stabilizer 125 can be rotated to any suitable orientation relative to the fuselage 115 that minimizes the effect of blade/wing downwash.

The motor 130 can be any suitable motor, including but not limited to an electric motor. In one embodiment, the pivot angle of the motor/propeller system is controlled by a flight control computer (not shown). In another embodiment, the pivot angle of the motor/propeller system is a function of airspeed, such that the motor/propeller system is perpendicular to the tail section 115 when the aircraft 100 is in hover or low speed helicopter mode and parallel to the tail section 115 when the aircraft 100 reaches high speed in fixed wing or helicopter flight modes.

Figure 7C:
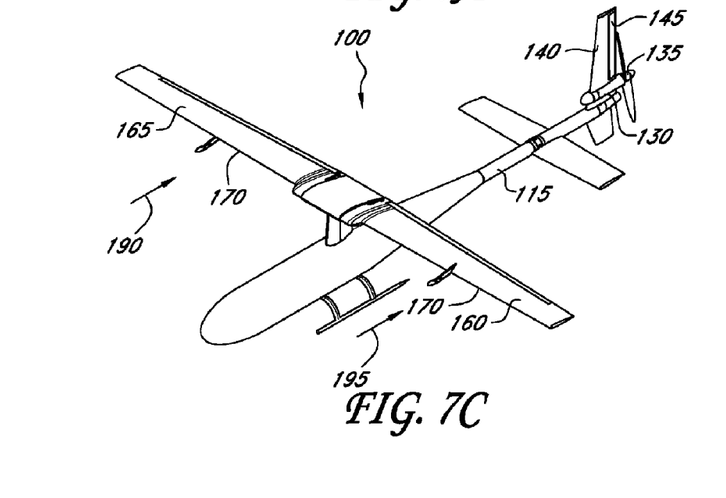

FIG. 7C illustrates the aircraft 100 in a fixed wing flight mode according to one embodiment. The blades/wings 160, 165 are parallel to the ground and not rotating such that the leading edges 170 of the blades/wings 160, 165 face into the relative airflow, indicated by the arrows 190, 195. As described above with reference to FIG. 1, the pivoting tail system can include a pusher propeller 135 when the aircraft 100 flies in the fixed wing flight mode. Thus, for example, when the aircraft 100 transitions to the fixed wing flight mode, the motor/propeller system can pivot 90 degrees such that the motor 130 is parallel to the tail section 115. When the motor 130 pivots, the tail rotor 135 also pivots to serve as a pusher propeller 135. In the fixed wing flight mode, the pusher propeller 135 thus rotated can provide additional forward thrust. When the motor 130 pivots, the vertical stabilizer 140 and the rudder 145 also pivot, thus providing a conventional rudder control mechanism commonly used in fixed wing aircraft designs.

Figure 7D:
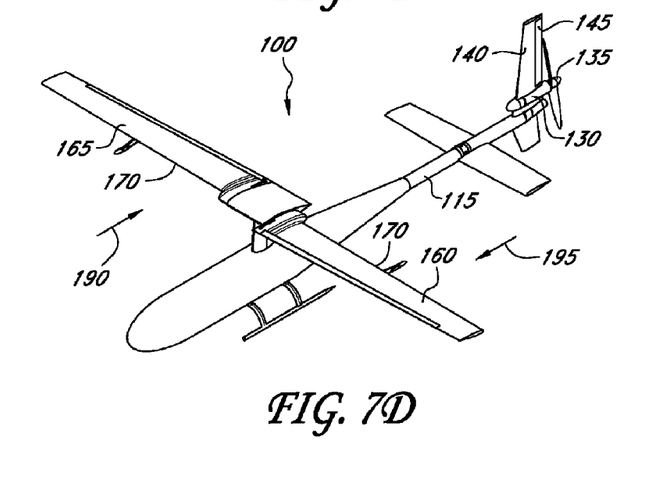

FIG. 7D illustrates the aircraft 100 in a high speed helicopter flight mode according to one embodiment. The blades/ wings 160, 165 are parallel to the ground and rotating such that the leading edges 170 of the blades/wings 160, 165 face into the relative airflow, indicated by the arrows 190, 195. In one embodiment of the high speed helicopter flight mode, the motor/propeller system pivots 90 degrees such that the motor 130 and the pusher propeller 135 are parallel to the tail section 115. The pusher propeller 135 thus rotated can serve as a pusher propeller providing additional forward thrust to the aircraft 100 in the high speed helicopter mode. As described above with reference to FIG. 7C, the vertical stabilizer 140 and the rudder 145 according to one embodiment also pivot when the motor 130 pivots, thus providing a conventional rudder control mechanism. In one embodiment, the vertical stabilizer and rudder thus pivoted parallel to the tail section 115 reduces the blockage efficiency loss associated with conventional helicopters having fixed tail rotors and vertical stabilizers.

Persons of skill in the art will understand the aircraft 100 need not comprise a pivoting tail motor/propeller system. Thus, the aircraft 100 may comprise a non-pivoting single- or double-bladed tail rotor and a single- or double-bladed pusher propeller located in the tail section 115. In another embodiment, the aircraft 100 comprises a non-pivoting single- or double-bladed tail rotor located in the tail section 115 and a tractor propeller located in the nose section 110. In this configuration, the tail rotor may be stopped when the aircraft 100 is flying in fixed wing flight mode to minimize drag and power consumption. The tail rotor according to one embodiment is single-bladed with a streamlined counterweight configured to minimize drag when stopped in fixed wing flight mode.

It will also be understood that the aircraft 100 can include feedback sensors that enable a smooth conversion between flight modes, including but not limited to stopping the blades/wings 160, 165 to transition to the fixed wing flight mode. The same actuators, flight controls, and sensors can be used for both helicopter and fixed wing flight modes. In another embodiment, the aircraft 100 comprises a high bandwidth servo flap actuator 230 and an electronic feedback control system that can hold the blades/wings 160, 165 at a desired pitch position in both flight modes. In still another embodiment, the aircraft 100 comprises computer hardware and/or software systems that can initiate and control flight mode conversions.

The aircraft 100 can comprise an electric drive system and a fuel-battery-electric hybrid propulsion system that allows the aircraft 100 to fly covertly in a battery-electric quiet flight mode. In another embodiment, the aircraft 100 is a gas turbine-electric hybrid aircraft. Thus, for example, the aircraft 100 according to one embodiment comprises a gas turbine-powered pusher propeller 135, an electric motor-driven tail rotor 135, and an electric drive motor 235. The electric motors described herein can be powered by engine-driven generators or batteries. In one embodiment, the electric motor-driven tail rotor 135 allows the tail rotor to be quickly and efficiently stopped and/or positioned during conversions between flight modes. In another embodiment, the electric drive motor 235 allows the blade/wing mast 230 to spin up very quickly and efficiently, thus smoothing conversion between flight modes, reducing the time to complete a conversion between flight modes, and/or minimizing altitude loss during conversion between flight modes. In still another embodiment, the high torque and precise control of the electric drive system of the aircraft 100 allow the blades/wings 160, 165 to stop and spin up to speed quickly during transition between flight modes.

The weight of electric motor drive systems described herein can be optimized. For example, in one embodiment, the electric motor drive system need only provide power for a short time during take off and landing and need not be sized for continuous operation during flight. In one embodiment, the electric motor drive system is configured to provide power during takeoff and landing, for a duration of, for example, 30 seconds, 1 minute, 3 minutes, or 5 minutes. In some aspects, the aircraft 100 flying in the helicopter control mode can offer more than a 100 percent increase in range and speed compared to equivalent conventional helicopters, with less than a 10 percent decrease in useful payload, such as battery, fuel, or cargo payload.

Embodiments of the present invention can include various pusher propeller configurations. In one embodiment, the aircraft 100 includes a pusher propeller to accommodate payload located in the nose section 110. In another embodiment, the aircraft 100 includes a pusher propeller located on top of the vertical stabilizer 140. The pusher propeller in some embodiments is vector-able to allow the propeller to function as a tail rotor in helicopter flight mode. In yet another embodiment, the aircraft 100 includes a pusher propeller 135 with turning vanes in the slip stream, eliminating the need for a separate tail rotor.

Further, embodiments of the present invention can include various propulsion configurations. In one embodiment, the blades/wings 160, 165 are driven by blade-mounted electric motors driving propellers. This configuration may reduce or eliminate the need for a tail rotor and a propeller. In another embodiment, the blade-mounted propellers spin the blades/wings 160, 165 when the aircraft 100 hovers in the helicopter flight mode, and provide thrust in the fixed wing flight mode. In yet another embodiment, a small electric motor driving the blades/wings 160, 165 offers hover yaw control and generates reaction torque on the airframe of the aircraft 100. In this configuration, the wing span would not be limited by the need for clearance between the tail rotor and the spinning blades/wings 160, 165.

Persons of skill in the art will understand the blade/wing system according to embodiments described herein can significantly reduce aerodynamic drag associated with swashplates and associated linkages on conventional rotary aircraft designs. The blades/wings according to some embodiments can have a high sail-plane-like aspect ratio and very low induced drag. Further, the interface between the blade/wing system and mast fairing can be very low drag compared to conventional rotary aircraft designs, which require control linkages and lack electronically controlled blade-mounted actuators. The blade/wing system according to embodiments described herein can also be significantly simpler and less mechanically complex than conventional designs comprising swashplates and associated linkages. The stop rotor capability according to some embodiments of the present invention can increase the effective lift to drag ratio at high airspeeds, allowing for less vibration and increased ranges over conventional aircraft designs.

The high speed closed loop flap/teeter control system can improve aircraft performance in high wind conditions. Further, the airfoil performance of the blade/wing system described herein is not compromised by operating blades/wings in reversed airflow. The aircraft 100 is lighter and less complex than conventional designs because the same actuators and control surfaces on the blades/wings 160, 165 can be used for both helicopter and fixed wing flight modes. Advantageously, the blade/wing system can adjust the blade/wing configuration to optimize flight performance in a given flight mode.

Embodiments of the present invention can offer advantageous features, including, but not limited to: a conventional fuselage and tail rotor orientation; improved hover efficiency due at least in part to lower disk loading; improved hover efficiency due at least in part to, in some embodiments, a large wingspan; reduced mechanical complexity; in some embodiments, a propeller that can be optimized for fixed wing flight mode and sized to allow fixed wing flight mode landings without hitting the runway; reduction or elimination of the hover download penalty associated with compound helicopter designs; reduction or elimination of drag associated with a rotor system in fixed wing flight mode; improved fixed wing flight mode performance due at least in part to, in some embodiments, a higher wing aspect ratio and a longer tail moment arm; and the ability to convert between flight modes, in some embodiments, in a few seconds with minimal disturbance in the flight path.

Persons of skill in the art will also understand embodiments of the invention are capable of unmanned flight, improved payload capacity, vertical takeoff and landing (VTOL), efficient hover, high speed, advantageous aerodynamic performance, and long range during a single flight. Alternative embodiments are capable of some but not all of these features during the course of one flight, without departing from the scope of the invention. It also will be understood that cambered and/or twisted wing panels can be achieved, such as, for example, by adding camber to the airfoils described herein. In addition, multiple actuators on the blades/wings 160, 165 can be used to control multiple trailing edge surfaces and generate twisted wing panels. In one embodiment, such airfoil design changes provide performance improvements and flight control redundancy in both the helicopter and fixed wing flight modes.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. An aircraft capable of helicopter and fixed wing flight modes, comprising:
   a plurality of wings, each wing having a spar and a flap, the flap being movable with respect to the spar;
   a flap actuator configured to move the flap;
   a center section rotatably coupled to each spar and including at least one spar actuator and at least one torsionally flexible element coupled to the at least one spar actuator, the spar actuator being configured to rotate at least one of the plurality of wings about a rotational axis of the spar when the aircraft transitions between helicopter and fixed wing flight modes; and
   at least one torsion spring configured to apply a pre-pitch moment to the plurality of wings, thereby biasing the plurality of wings to a leading-edge up orientation.

2. The aircraft of claim 1, wherein the torsionally flexible element is a spring.

3. The aircraft of claim 1, wherein the torsion spring comprises a strap pack coupled to the center section.

4. The aircraft of claim 1, wherein the aircraft further comprises:
   a closed loop control system comprising a teeter pin and one or more snubber blocks, wherein the control system is configured to control motion of the plurality of wings about a longitudinal axis of the teeter pin.

5. The aircraft of claim 1, wherein an aerodynamic center of each wing is located aft of the rotational axis of the spar.

6. A method for transitioning an aircraft between flight modes, the method comprising:
   changing the motion of a center section of the aircraft relative to a fuselage of the aircraft from a first flight mode to a second flight mode, wherein the direction of relative airflow over one of a plurality of wings reverses when the aircraft transitions from the first to the second flight mode;
   rotating the one of a plurality of wings such that a leading edge of the wing faces into the new direction of relative airflow; and
   changing the orientation of a tail rotor relative to the fuselage, wherein the tail rotor is oriented in a first position when the aircraft is in the first flight mode and oriented in a second position when the aircraft is in the second flight mode, and wherein the first and second positions are different.

7. The method of claim 6, wherein the center section rotates relative to the fuselage in the first flight mode and does not rotate relative to the fuselage in the second flight mode.

8. The method of claim 6, wherein the center section does not rotate relative to the fuselage in the first flight mode and rotates relative to the fuselage in the second flight mode.

9. The method of claim 6 further comprising:
   changing the orientation of the tail rotor from the first position to the second position when the aircraft is in either the first or second flight mode.

* * * * *